(12) United States Patent
Bruenner et al.

(10) Patent No.: US 8,677,019 B2
(45) Date of Patent: Mar. 18, 2014

(54) DATA COMMUNICATION METHOD USING UNAMBIGUOUS VEHICLE IDENTIFICATION INFORMATION

(75) Inventors: Guenter Bruenner, Geltendorf (DE);
Martin Baumgartner, Zorneding (DE);
Klaus Rebhan, Hohenwart (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 924 days.

(21) Appl. No.: 12/209,729

(22) Filed: Sep. 12, 2008

(65) Prior Publication Data

US 2009/0070488 A1    Mar. 12, 2009

Related U.S. Application Data

(63) Continuation of application No. PCT/EP2007/001948, filed on Mar. 7, 2007.

(30) Foreign Application Priority Data

Mar. 13, 2006   (DE) .......................... 10 2006 011 829

(51) Int. Cl.
*G06F 15/16*   (2006.01)

(52) U.S. Cl.
USPC ........... 709/245; 709/217; 709/228; 709/229; 702/187; 702/73; 342/431; 455/345

(58) Field of Classification Search
None
See application file for complete search history.

(56) References Cited

U.S. PATENT DOCUMENTS

| | | | | |
|---|---|---|---|---|
| 5,159,592 A | * | 10/1992 | Perkins | 370/338 |
| 5,812,819 A | * | 9/1998 | Rodwin et al. | 703/23 |
| 6,219,697 B1 | * | 4/2001 | Lawande et al. | 709/221 |
| 6,263,268 B1 | * | 7/2001 | Nathanson | 701/31.5 |
| 6,751,475 B1 | * | 6/2004 | Holmes et al. | 455/557 |
| 6,782,313 B1 | * | 8/2004 | Frech et al. | 701/31 |
| 6,842,762 B2 | * | 1/2005 | Raithel et al. | 1/1 |
| 6,968,394 B1 | * | 11/2005 | El-Rafie | 709/245 |
| 7,260,638 B2 | * | 8/2007 | Crosbie | 709/229 |
| 7,613,563 B2 | * | 11/2009 | Haegebarth et al. | 701/117 |
| 7,630,308 B1 | * | 12/2009 | Loher | 370/230.1 |
| 2001/0033225 A1 | * | 10/2001 | Razavi et al. | 340/425.5 |
| 2001/0055977 A1 | * | 12/2001 | Holzer | 455/461 |

(Continued)

FOREIGN PATENT DOCUMENTS

| | | |
|---|---|---|
| DE | 102 34 850 A1 | 2/2004 |
| JP | 2001351135 A * | 12/2001 |
| WO | WO 03/049408 A1 | 6/2003 |
| WO | WO 2005/076103 A2 | 8/2005 |

OTHER PUBLICATIONS

German Search Report dated Jan. 10, 2007 with an English translation of the relevant portions (Nine (9) pages).

(Continued)

*Primary Examiner* — Ian N Moore
*Assistant Examiner* — Dung B Huynh
(74) *Attorney, Agent, or Firm* — Crowell & Moring LLP

(57) ABSTRACT

A data communication method between a first communication user arranged at a motor vehicle and a second communication user arranged outside the motor vehicle is provided. The first communication user can be addressed by the second communication user by way of a network address. The network address of the first communication user is defined by an address management unit arranged outside the motor vehicle and is transmitted to the first communication user.

7 Claims, 3 Drawing Sheets

(56) References Cited

U.S. PATENT DOCUMENTS

| | | | |
|---|---|---|---|
| 2002/0035699 A1* | 3/2002 | Crosbie | 713/201 |
| 2002/0087240 A1* | 7/2002 | Raithel et al. | 701/35 |
| 2002/0098840 A1* | 7/2002 | Hanson et al. | 455/435 |
| 2002/0105968 A1* | 8/2002 | Pruzan et al. | 370/465 |
| 2002/0165952 A1* | 11/2002 | Sewell et al. | 709/224 |
| 2002/0181405 A1* | 12/2002 | Ying | 370/245 |
| 2003/0034882 A1* | 2/2003 | Banerjee et al. | 340/425.5 |
| 2003/0080619 A1* | 5/2003 | Bray et al. | 307/10.1 |
| 2003/0103482 A1* | 6/2003 | Van Bosch | 370/338 |
| 2003/0163646 A1* | 8/2003 | O'Neil | 711/137 |
| 2003/0208687 A1* | 11/2003 | Liang et al. | 713/200 |
| 2003/0220994 A1* | 11/2003 | Zhu | 709/223 |
| 2005/0021200 A1* | 1/2005 | Taki | 701/33 |
| 2005/0131595 A1* | 6/2005 | Luskin et al. | 701/29 |
| 2005/0273505 A1* | 12/2005 | Kim | 709/220 |
| 2006/0022842 A1* | 2/2006 | Zoladek et al. | 340/870.07 |
| 2006/0161341 A1* | 7/2006 | Haegebarth et al. | 701/209 |
| 2006/0233228 A1* | 10/2006 | Liang | 375/222 |
| 2007/0032207 A1* | 2/2007 | Shah | 455/111 |
| 2007/0032916 A1 | 2/2007 | Mark | |
| 2007/0124063 A1* | 5/2007 | Kindo | 701/208 |
| 2008/0137590 A1* | 6/2008 | Stott et al. | 370/328 |
| 2009/0281687 A1* | 11/2009 | Keane | 701/29 |

OTHER PUBLICATIONS

International Search Report dated Jun. 14, 2007 with an English translation (Four (4) pages).

* cited by examiner

DATA COMMUNICATION METHOD USING UNAMBIGUOUS VEHICLE IDENTIFICATION INFORMATION

CROSS-REFERENCE TO RELATED APPLICATIONS

This application is a continuation of PCT International Application No. PCT/EP2007/001948, filed Mar. 7, 2007, which claims priority under 35 U.S.C. §119 to German Patent Application No. 10 2006 011 829.4, filed Mar. 13, 2006, the entire disclosures of which are herein expressly incorporated by reference.

BACKGROUND AND SUMMARY OF THE INVENTION

The invention relates to a method for communicating data between a first communication user arranged at a motor vehicle and a second communication user arranged outside the motor vehicle, whereby the first communication user can be addressed by the second communication user via a network address.

From the state of the art, different methods are known for the data communication between a first communication user arranged at a motor vehicle and a second communication user arranged outside the motor vehicle. For connecting the motor vehicle with an external communication user or a communication user arranged outside the motor vehicle, a bus system in the form of a so-called OBD access (OBD=On-Board Diagnosis) is normally used.

Such an OBD access permits a point-to-point connection with a communication user arranged outside the motor vehicle which, however, has several disadvantages. As a result of the bus system, the quantity of the transferable throughput is limited and relatively low. Special hardware is required for the data transmission, which causes additional costs. In addition, a separate communication infrastructure has to be established. Furthermore, the communication can only take place with a single communication partner simultaneously.

From the state of the art, different approaches are also known for using technologies which, in other technical fields, have become a standard, for methods of the above-mentioned type. It is known, for example, to provide an Ethernet interface in the case of the motor vehicle and, while utilizing an Ethernet connection, to exchange data between a first communication user arranged at a motor vehicle and a second communication user arranged outside the motor vehicle. A special variation of such a method is described in International patent document WO 2005/076103 A2.

However, it is a disadvantage of all of these known methods that they are accompanied by high technical expenditures because, as a rule, either on the vehicle side parallel to the previous OBD interface, completely independent additional communication mechanisms have to be provided, or existing communication structures (such as a CAN bus) have to be expanded by corresponding devices and methods for an interface adaptation.

The methods of the above-mentioned type known from the state of the art also have the disadvantage that no unambiguous addressing of a large number of motor vehicles is possible because, as a rule, the number of addresses available in a network or subnetwork is limited.

It is an object of the invention to provide a simple method for data communication between a first communication user arranged at a motor vehicle and a second communication user arranged outside the motor vehicle, which permits the addressing of a large number of motor vehicles.

According to the invention, the network address of the first communication user is determined by an address management unit arranged outside the motor vehicle and by the address management unit at the first communication user. A dynamic address allocation is permitted in this fashion. The first communication user can be addressed by other communication users by way of the network address dynamically allocated to this first communication user.

The network address is preferably allocated to a central gateway (ZGW) of the motor vehicle by way of which the entire data communication of the motor vehicle toward the outside and from the outside respectively is carried out. Since, as a rule, only a single such central gateway exists in the motor vehicle, the allocated network address will then, as it were, relate to the motor vehicle as such. The vehicle itself can therefore be addressed by other communication users, for example, a diagnostic tester, by way of the network address dynamically allocated to it. In such a case, the central gateway is the first communication user according to the invention.

In principle, one network address respectively can also be assigned to several communication users arranged at a single motor vehicle. However, this case will not be discussed here further without limiting the generality.

In the case of a dynamic address allocation, as it is made possible as a result of the invention, no durably separate unambiguous network address is assigned to a motor vehicle to be integrated in a network. On the contrary, one and the same network address can be assigned to different motor vehicles at different times. The address allocation will then be comparable to that of a DHCP server (DHCP=Dynamic Host Configuration Protocol) known from the state of the art for other technical fields.

A network address assigned to a motor vehicle has to be unambiguous only within the respective network. The number of available network addresses of a network, which is limited as a rule, then only has to be dimensioned to be sufficiently large that all motor vehicle to be simultaneously integrated in the network, can be assigned different network addresses. Non unambiguous network addresses have to be available for all motor vehicles that can potentially be integrated in the network.

The address management unit is preferably constructed as a DHCP server. This has the advantage that systems and methods which are known from the state of the art of other fields and are available at reasonable cost can be used for implementing the invention.

According to a preferred embodiment of the invention, for requesting a network address, a request message containing an unambiguous vehicle identification of the motor vehicle is transmitted by a communication user arranged at the motor vehicle, such as the central gateway, to the address management unit. The request message preferably essentially consists of the unambiguous vehicle identification itself. In principle, the request message can also be sent by a communication user arranged at the motor vehicle, which communication user is not identical with the first communication user according to the invention. However, this request message is preferably sent by the central gateway.

By sending the request message, a vehicle, as it were, can report to the network as soon as it is physically connected with the network. A network address will then be assigned to it, by which it can be addressed by other network users. Instead of a request message, which contains a vehicle identification or essentially consists of this vehicle identification, any other request message can basically be sent for this purpose. However, it is advantageous for an unambiguous vehicle identification to be known at the address management unit. The reason is that, in this manner, an assignment can be made between the unambiguous vehicle identification and the given network address.

Assignment data for the assignment between the unambiguous vehicle identification sent for the request and the then defined network address are preferably stored at the address management unit.

As a result, it becomes possible to unambiguously determined during the dynamic address allocation which motor vehicle is assigned to which network address. The storing can take place, for example, in a list form or table form. The assignment can preferably also take place subsequently; that is, it can be determined which motor vehicle was assigned to which network address. For example, for each motor vehicle once (or within a certain time period) integrated in the network, a network history can be stored with the address management unit, which documents at which time which network address was assigned to the motor vehicle or its vehicle identification.

Because of the fact that it allocates the network addresses to motor vehicles integrated in the network, the address management unit is predestined to store such assignment data for a later use, for example, for the possibility of a query by a network user. The address management unit can therefore carry out the task of an address exchange unit at which the network address pertaining to a vehicle identification can be queried by other communication users.

According to a preferred embodiment of the invention, the data functionality of the reproduction of assignment data upon a request of a network user is, however, shifted to a separate address exchange unit constructed separately from the address management unit. Assignment data for the assignment between the unambiguous vehicle identification sent for the request and the then determined network address are stored with an address exchange unit, at which the network address pertaining to a vehicle identification can be queried by other communication users. For this purpose, the assignment data can be transferred from the address management unit to the separately constructed address exchange unit.

The reproduction of assignment data by the address exchange unit will then be comparable to the functionality of a DNS server (DNS=Domain Name Server) known from the state of the art for other technical fields. The address exchange unit is preferably constructed as a DNS server. This has the advantage that systems and methods known from the state of the art and available at reasonable cost can be used for the implementation of the invention.

The unambiguous vehicle identification is preferably the chassis number (vehicle identification number) of the motor vehicle. The vehicle identification number is a wide-spread and proven identification for a motor vehicle. Methods and systems are known from the state of the art for storing the vehicle identification number of a motor vehicle in data form at the motor vehicle and to output it, as required, in a communication-related manner.

According to a preferred embodiment of the invention, the definition or allocation of the network address by the address management unit can also take place as a function of the vehicle identification. The allocated network address can, for example, depend on the vehicle identification such that a certain network address is assigned to a certain vehicle as the preferred address, such as a network address that had already been assigned earlier to the same vehicle.

In the case of the invention, the communication between the first and the second communication user preferably takes place by way of a standard interface, particularly an Ethernet interface. The communication between the first and the second communication user preferably takes place by way of a standard protocol, particularly TCP/IP. The assignment of a network address, for example, an IP address, according to the invention permits the utilization of most modern network technologies as well as of the pertaining systems and methods. As a rule, particularly in the case of high production rates, the utilization of standard systems and methods results in considerable cost advantages and high reliability. In addition, very high transmission rates can be reached. For example, data transmission via the Ethernet can take place which has a transmission rate of up to twenty times the transmission rate of the OBD.

Utilizing the respective communication technology, the invention permits a comfortable addressing of all communication users. To the extent that the communication technology used provides it, the simultaneous communication of one communication user with several other communication users is also contemplated. Thus, the integration of vehicles according to the invention into a network, particularly an Ethernet network, makes it possible that a diagnostic tester communicates simultaneously with several vehicles and/or that several diagnostic testers simultaneously communicate with one vehicle.

According to a preferred embodiment of the invention, on the vehicle side, at the first communication user, an input data stream transmitted during the data communication from the second communication user is converted by way of a vehicle access application to a diagnostic data stream in the data format of a conventional diagnostic communication. The diagnostic data stream is therefore reconstructed on the vehicle side.

In this case, it is advantageous that the structures of a conventional OBD access, which usually already exist nowadays and are often prescribed by law, on the vehicle side as well as on the side of the second communication user, for example, a diagnostic tester, are changed as little as possible.

The diagnostic messages present at the second communication user, for example, a diagnostic tester, in the data format of a conventional diagnostic communication, that is, in the conventional diagnostic message format, are therefore preferably only preprocessed, for example, packetized, such that at the diagnostic tester that they can be transmitted to the first communication user by way of selected standard technology, such as TCP/IP over the Ethernet. For the preprocessing, a consideration of the data has to take place only to the transport level (and above). The data processing at the lower communication-related levels is carried out by the standard components of the standard technology used. The data stream arriving at the first communication user is converted back to the diagnostic message format by corresponding processing steps of the vehicle access application inverse to the preprocessing. Also in this case, the consideration can be limited to the transport level. As a result, the same diagnostic messages are present at the first communication user which had at first been present on the other side of the communication connection at the second communication user. The thereby reconstructed diagnostic data stream can then be processed on the vehicle side in the same manner as known from the conventional diagnostic communication. A very simple vehicle-side implementation of the method thereby becomes possible for which hardly any (or no) vehicle components have to be changed.

Since the diagnostic messages present at the second communication user only have to be adapted to the used transmission technology and at the end of the transmission route have to be reconstructed at the first communication user, the described method provides a very slim transmission protocol with a very low overhead for the transmission of standardized diagnostic messages. Standard diagnostic messages can therefore be transmitted without delay, in a safe manner and without any major scratch buffers into the vehicle and out of the vehicle. A multiplexer (control bytes) preferably permits the expansion to other data types as diagnostic messages.

The OBD access, particularly the OBD plug, of the motor vehicle can preferably still be used in a conventional manner. In the simplest case, a separate connection is provided for the additional used communication technology, for example, the Ethernet. However, according to a particularly preferred embodiment of the invention, free contacts of the OBD plug are utilized to which the signals of the additional used communication technology, for example, the Ethernet are applied. No additional plug-type connection then has to be provided. The conventional OBD connection and the additional communication connection, for example, the Ethernet, are combined in one plug-type connection. As a result, costs are saved for additional plug-type connections. Furthermore, time and expenditures are eliminated for the actual placing of several plugs.

For the vehicle-internal distribution of the signals of different data connections (for example, the conventional OBD connection and the Ethernet), on the vehicle side, a gateway unit can be used which is comparable to the CFFS described in International patent document WO 2005/076103 A2.

According to a further development of the invention, the unambiguous vehicle identification of the motor vehicle can additionally be queried by a network user arranged outside the motor vehicle. For this purpose, the querying network user preferably sends a query message to the network address assigned to the motor vehicle. The motor vehicle responds to this query message with a response message containing the unambiguous vehicle identification of the motor vehicle. An undirected query of all vehicles in a network or network segment by means of a broadcast is also contemplated (such as a query on the broadcast address; all vehicles in a subnet respond).

In this case, the querying network user may basically be any other network user, such as another motor vehicle integrated in the network. The query may also be linked to the condition of an authorization. Only those network users may, for example, be permitted to query who have a special authorization in this respect.

The querying network user may also be a network-side vehicle recognition service. In the case of the latter, a list of several, preferably all motor vehicles which are currently registered, have ever been registered, or are registered for a defined time period in the network can be established by way of the received vehicle identifications of different vehicles. This may, for example, be advantageous for documentation purposes during vehicle production or for vehicle servicing.

It may be the purpose of the query of the vehicle identification by the querying network user to permit an assignment between vehicle identifications and network addresses. The list of a vehicle recognition service preferably also allows an assignment between the vehicle identifications and of one or several assigned network addresses respectively. Such an assignment between a network address and a received vehicle identification, as a rule, is easily possible for the querying network user when the latter has previously addressed the respective motor vehicle in a targeted manner by way of its network address and has then received the vehicle identification as an immediate response. It may nevertheless be advantageous to also transmit the network address together with the vehicle identification to the querying network user. This can further simplify the assignment. In addition, as a result, the network user, for example, a vehicle recognition service, receiving the vehicle identification can carry out an assignment between the network address and the vehicle identification also in cases in which the vehicle identification has been sent to the receiving network user unrequested or upon the request of another network user. It may, for example, be advantageous, after the assignment of a network address by the address management unit, for the vehicle to automatically send its unambiguous vehicle identification together with the assigned network address to a vehicle recognition service. If this takes place in this manner for all motor vehicles registered on the network, the vehicle recognition service will be fully informed concerning the assignment between network addresses and vehicle identification. As another example for a case in which the vehicle identification is sent unrequested or upon a request of another network user to a vehicle recognition service, it is also contemplated that, without thoroughly taking into account the respective network address, a query is sent to all vehicles currently registered in the network.

As described above, such a vehicle recognition service is preferably provided in addition to an address management unit and, as required, an address exchange unit. It also can completely or partially carry out the task of an address exchange unit if the assignment list of the vehicle recognition service permits an assignment between vehicle identifications and network addresses, which can be queried by other communication users. An address exchange unit may also be used for queries as to which network address is assigned to which vehicle identification; whereas a vehicle recognition surface is used for queries as to which motor vehicle is currently integrated in a network.

As a result of the possibility of a direct query or the output of the vehicle identification controlled by another event, an access to an address management unit or an address exchange unit can be avoided when such a unit is overloaded, cannot be reached, or has failed.

It is also contemplated to connect a diagnostic tester directly (without a network) to the motor vehicle. In the case of such a direct connection between the motor vehicle and the diagnostic tester, the direct query of the vehicle identification can also be utilized for determining the vehicle identification by the diagnostic tester.

In individual cases, it may also be simpler with respect to the communication for a network user to carry out a direct query of the unambiguous vehicle identification at a current or potential communication partner than to query it at the address management unit or the address exchange unit. Furthermore, network users not authorized to query the assignment data from the address management unit or the address exchange unit may be provided with the possibility of querying in an individual case the unambiguous vehicle identification of a current or potential communication partner.

It is pointed out that the possibility of a direct query of the vehicle identification may also be advantageous independently of the invention in the case of methods of the above-mentioned type.

According to a preferred embodiment of the invention, the second communication user in accordance with the invention is constructed as a diagnostic tester. The diagnostic tester can then address a motor vehicle, with which it is to be connected, for example, for diagnostic purposes, by way of the network address of the motor vehicle. When the diagnostic tester knows only the vehicle identification of the motor vehicle, the current network address assigned to the vehicle identification, as required, can be queried at an address exchange unit. If a vehicle recognition service is present, the diagnostic tester, as required, can also inquire at the vehicle recognition service as to whether the concerned motor vehicle is currently integrated in the network.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 3:
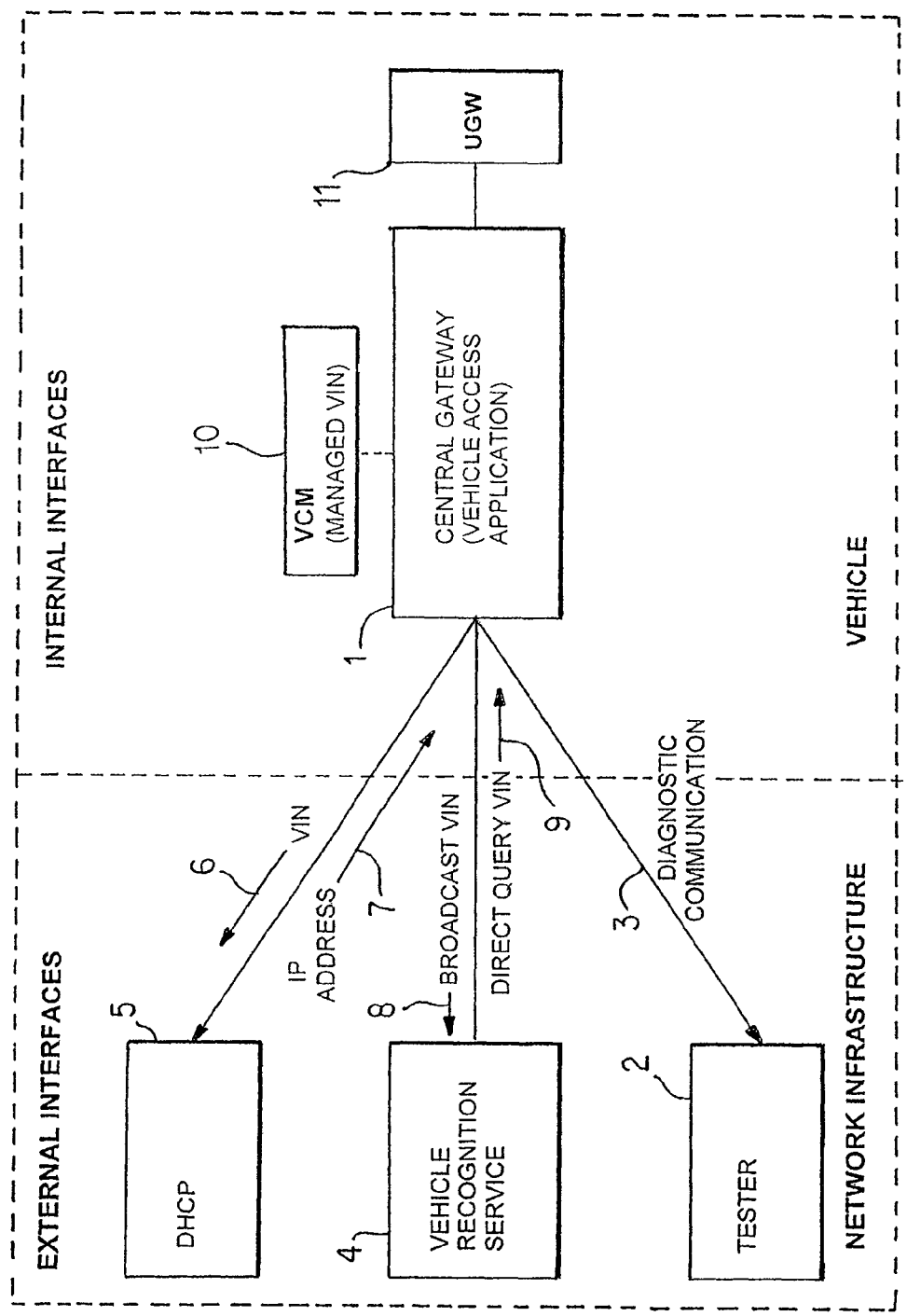
FIG. 3 is a schematic view of the essential signal flows in the case of a preferred embodiment of a method according to the invention.

FIG. 3 illustrates the essential signal flows in the case of a preferred embodiment of a method according to the invention. For diagnostic purposes, the central gateway (ZGW) 1 of a motor vehicle communicates with a diagnostic tester 2. The diagnostic communication is illustrated by an arrow 3. The diagnostic communication takes place by way of an Ethernet connection.

For the communication within the network, an IP address is assigned to the vehicle.

A plurality of different vehicles is to be connectable with the diagnostic tester 2. Because of the large number of vehicles, the assignment of the IP address has to take place dynamically. In the present case, an IP address is assigned to the vehicle by the DHCP server 5 when the vehicle is connected to the network. During this process, the vehicle transmits its vehicle chassis number, also called a VIN (vehicle identification number)(arrow 6), to the DHCP server 5. In turn, the DHCP server assigns an IP address (arrow 7) to the vehicle or to the central gateway 1.

In addition, the DHCP server 5 transmits assignment data for the assignment between a vehicle chassis number and the assigned IP address to a DNS server (not shown graphically). As a result, the DNS server will later be able to output the network address to a certain vehicle chassis number.

Two mutually independent mechanisms are provided for the identification of the vehicle in the network; on the one hand, an identification by way of the DHCP server 5 and the above-mentioned DNS server.

On the other hand, a vehicle recognition service 4 is provided on the network side. After the IP address allocation has taken place, the central gateway (ZGW) 1 of the vehicle, by broadcast (arrow 8), sends the chassis number of the vehicle to the network-side vehicle recognition service 4. This broadcast 8 is received and evaluated by the network-side vehicle recognition service 4. By means of the received vehicle chassis numbers, the network-side vehicle recognition service 4 establishes a list of all vehicles currently integrated in the network, with the chassis number and the IP address.

In addition, the central gateway (ZGW) 1, upon a separate external query (arrow 9), supplies the chassis number of the vehicle to the network-side vehicle recognition service 4.

The function of the VCM component 10 (Vehicle Configuration Management) also illustrated in FIG. 3 and connected with the central gateway (ZGW) 1 is essentially known from the state of the art. In the present example, the function VCM 10 supplies the chassis number. The component UGW 11 also illustrated in FIG. 3 and connected with the central gateway (ZGW) 1 corresponds essentially to a CFFS known from International patent document WO 2005/076103 A2. In contrast to the illustration in FIG. 3, the functions VCM 10 and UGW 11 can also be carried out by the central gateway (ZGW) 1.

Figure 1:
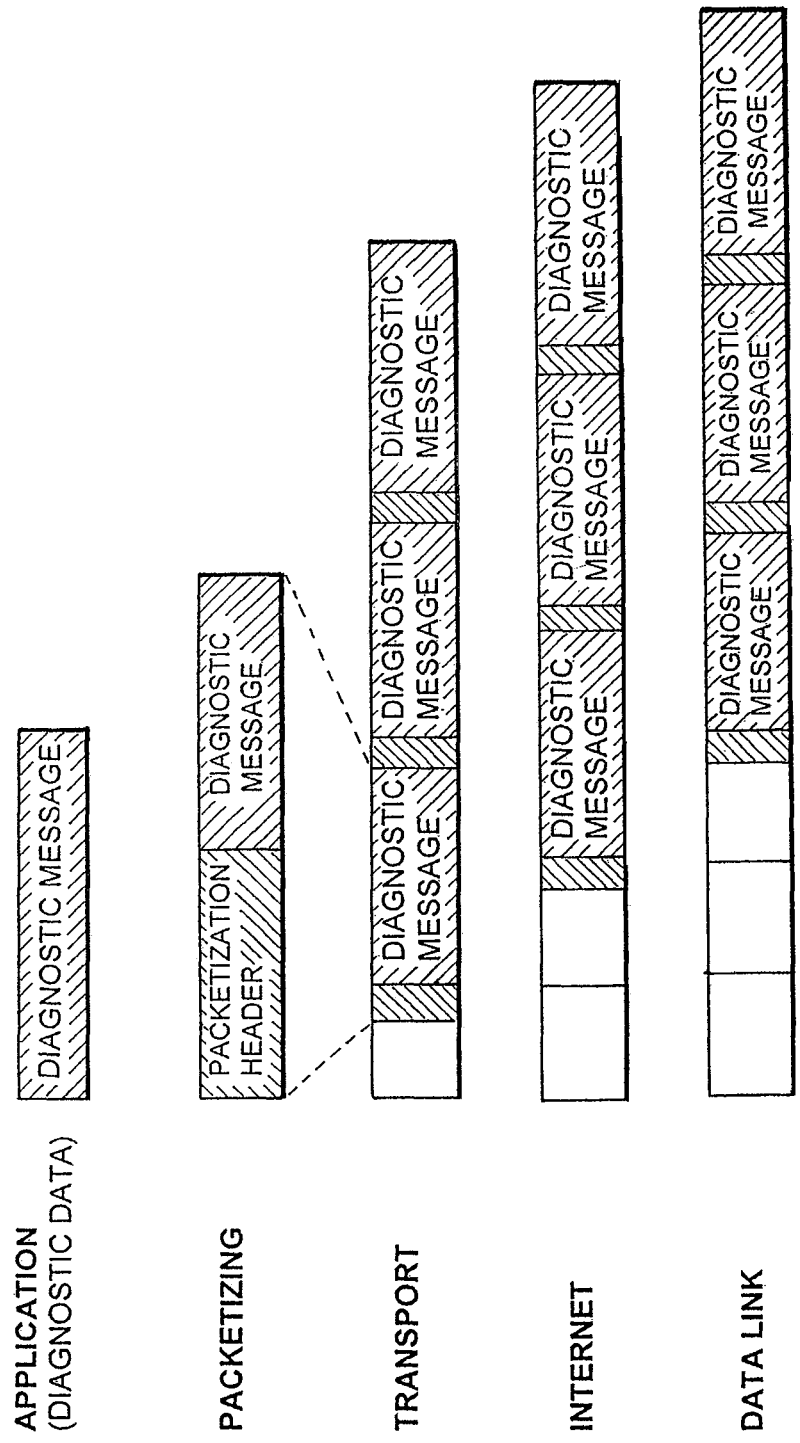
FIG. 1 is a schematic view of the communication-related layers of a diagnostic message to be sent.
Figure 2:
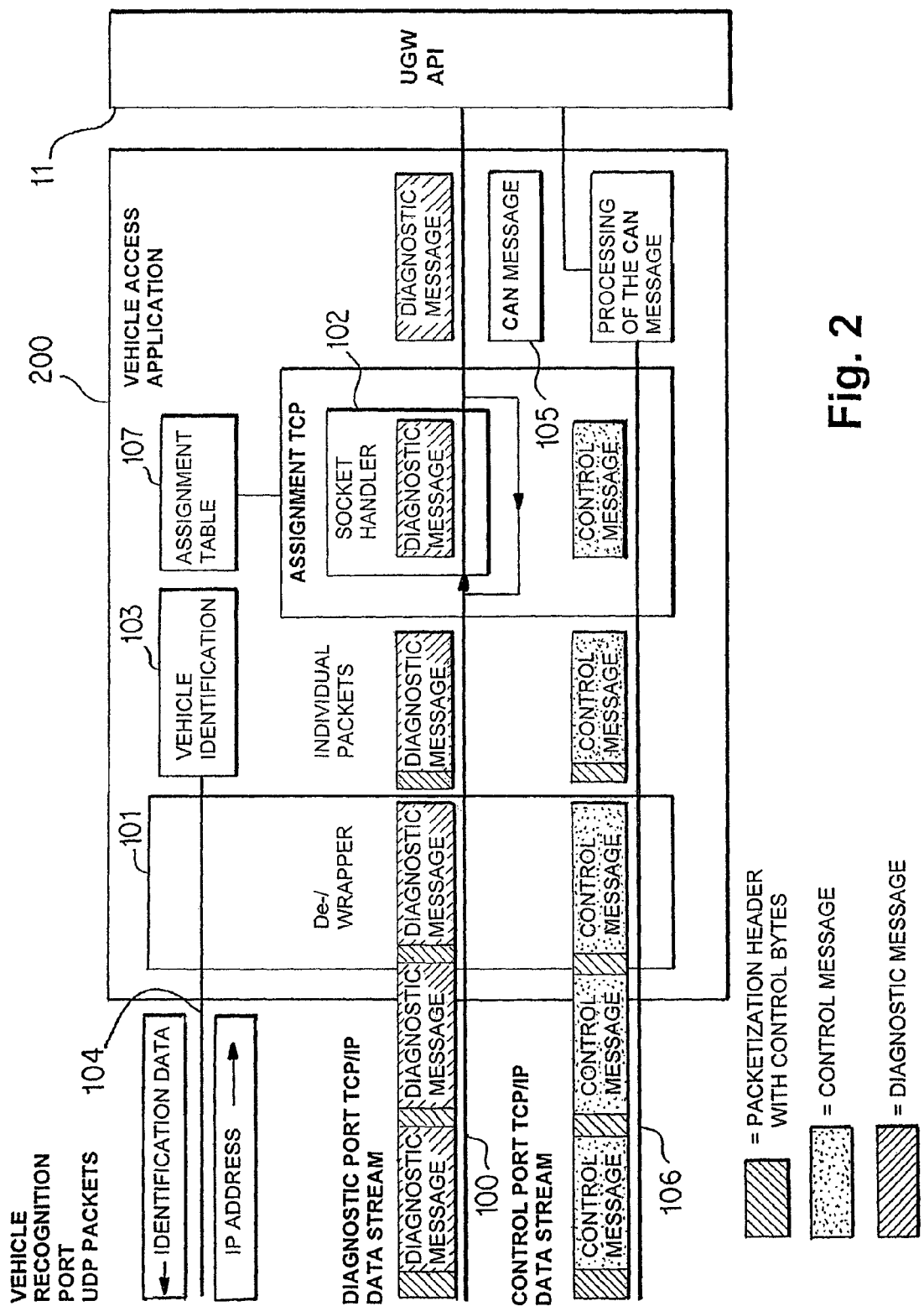
FIG. 2 is a schematic view of the essential processing steps of a preferred embodiment of a vehicle access application.

FIGS. 1 and 2 illustrate details of the diagnostic communication 3 between the central gateway (ZGW) 1 and the diagnostic tester 2.

FIG. 1 shows the communication-related layers of a diagnostic message to be sent. The diagnostic message is at first present as such ("application" layer) at the diagnostic tester. For packetizing, each diagnostic message is provided with a header (packetizing header, "packetizing" layer). For transport by way of the Ethernet connection, several diagnostic messages, including the respective packetizing header, are provided with a TCP header. The result is a data stream at the transport level ("transport" layer). A special consideration of the preprocessing of the diagnostic data to be sent at the diagnostic tester only has to take place to the transport level (and above). The data processing at the lower communication-related levels ("Internet" and "Data Link" layers in FIG. 1) is carried out by Ethernet standard components, which are integrated in the diagnostic tester.

The data stream at the transport level is transmitted by way of the Ethernet connection to the central gateway (ZGW) 1 of the motor vehicle.

FIG. 2 illustrates the essential processing steps of a vehicle-side vehicle access application. The vehicle access application 200 is implemented by the central gateway (ZGW) 1. Among other things, FIG. 2 shows the processing of the data stream arriving by way of the Ethernet connection, which arrives on a diagnostic port 100 of the vehicle access application 200.

Also at the vehicle, particularly at the central gateway (ZGW) 1, Ethernet standard components are provided for the diagnostic communication (arrow 3 in FIG. 3). The data stream established beforehand at the diagnostic tester 2 can be taken from the Ethernet standard components at the transport level.

From the data stream arriving at the diagnostic port 100 of the vehicle access application 200, the diagnostic messages which had previously been present at the diagnostic tester are reconstructed. For this purpose, the individual packets (in each case a diagnostic message provided with a packetizing header) are first extracted in a de-wrapper 101. In addition, a subsequent socket handler 102 separates the individual diagnostic messages from the respective packetizing header. The diagnostic messages are therefore present at the output of the vehicle access application 200 in the same form as if they had arrived in the vehicle in a conventional manner and can be further processed based on state of the art components without requiring special hardware components.

In the case illustrated in FIG. 2, the diagnostic messages are transmitted to a UGW 11, which essentially corresponds to a CFFS known from International patent document WO 2005/076103 A2.

FIG. 2 also illustrates that the linking of the motor vehicle to the vehicle recognition service 4 already described in connection with FIG. 3 in the present case is also converted in the vehicle access application 200. Upon the receipt of an IP address or upon a special request, the vehicle access application 200 sends out the vehicle identification 103 by way of the vehicle recognition port 104.

By way of the control data stream also illustrated in FIG. 2, data can be transmitted which are independent of the diagnostic data stream and which are not produced by means of diagnostic communication. An example is the query of terminal information, which is present as a CAN message 105 and is transmitted by way of the control data stream from the motor vehicle to the tester 2. In this case, the control port 106 is utilized. In the case of several testers, a response to an inquiry is assigned by means of an assignment table 107 to the respective inquiring tester. The packetizing format in the case of the control data stream is selected identically to the format of the diagnostic data stream; a multiplexer allows the adding of further control messages.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for data communication between a first communication user situated in a motor vehicle and a second communication user situated outside the motor vehicle, the first communication user being addressable by the second communication user via a network address, the method comprising the acts of:
   receiving, by an address management unit from the first communication user, a network address request message containing an unambiguous vehicle identification of the motor vehicle;
   defining, in response to receiving the network address request message containing the unambiguous vehicle identification, the network address of the first communication user by the address management unit situated outside the motor vehicle, wherein the network address is defined, based at least in part, on the unambiguous vehicle identification of the motor vehicle;
   transmitting the defined network address of the first communication user to the first communication user; and
   converting, by a vehicle access application at the first communication user situated in the motor vehicle, an input data stream transmitted from the second communication user into a diagnostic data stream having a data format of a conventional diagnostic communication, wherein assignment data for an assignment between the unambiguous vehicle identification received and the subsequently defined network address are stored at the address management unit, from which the network address pertaining to a vehicle identification can be queried by other communication users, and wherein communication between the first and the second communication user takes place by way of an Ethernet interface and a TCP/IP standard protocol.

2. The method according to claim 1, wherein the second communication user is a diagnostic tester.

3. The method according to claim 1, wherein the address management unit is constructed as a DHCP server and/or that the address exchange unit is constructed as a DNS server.

4. The method according to claim 1, wherein the unambiguous vehicle identification is a vehicle chassis number.

5. The method according to claim 1, wherein the vehicle access application is implemented by a central communication gateway of the motor vehicle.

6. A method for data communication between a first communication user situated in a motor vehicle and a second communication user situated outside the motor vehicle, the first communication user being addressable by the second communication user via a network address, the method comprising the acts of:
   receiving, by an address management unit situated outside the motor vehicle from the first communication user, a network address request containing an unambiguous vehicle identification of the motor vehicle;
   allocating, in response to receiving the network address request containing the unambiguous vehicle identification, the network address to the first communication user by the address management unit, wherein the network address is allocated based at least in part on an unambiguous vehicle identification of the motor vehicle;
   transmitting the defined network address of the first communication user to the first communication user; and
   converting, by a vehicle access application at the first communication user situated in the motor vehicle, an input data stream transmitted from the second communication user into a diagnostic data stream having a data format of a conventional diagnostic communication, wherein assignment data for an assignment between the unambiguous vehicle identification received and the subsequently defined network address are stored at the address management unit, from which the network address pertaining to a vehicle identification can be queried by other communication users, and wherein communication between the first and the second communication user takes place by way of an Ethernet interface and a TCP/IP standard protocol.

7. The method according to claim 6, wherein the unambiguous vehicle identification is a vehicle chassis number of the motor vehicle.

\* \* \* \* \*